United States Patent
Thompson et al.

(10) Patent No.: US 7,721,433 B2
(45) Date of Patent: May 25, 2010

(54) BLADE OUTER SEAL ASSEMBLY

(75) Inventors: Ralph J. Thompson, Wells, ME (US); Susan M. Tholen, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 1458 days.

(21) Appl. No.: 11/091,172

(22) Filed: Mar. 28, 2005

(65) Prior Publication Data
US 2006/0216146 A1 Sep. 28, 2006

(51) Int. Cl.
*B21K 25/00* (2006.01)
*F01D 5/20* (2006.01)
*B63H 7/02* (2006.01)

(52) U.S. Cl. .......... 29/889.2; 29/889.21; 29/889.22; 415/173.1; 415/173.3; 415/173.5; 416/189; 416/192

(58) Field of Classification Search ............ 29/889.2, 29/889.21, 889.22; 415/116, 173.1–173.5; 416/189, 192
See application file for complete search history.

(56) References Cited

U.S. PATENT DOCUMENTS

| | | | | |
|---|---|---|---|---|
| 5,375,973 A | * | 12/1994 | Sloop et al. | 415/173.1 |
| 5,639,210 A | * | 6/1997 | Carpenter et al. | 415/135 |
| 7,306,424 B2 | * | 12/2007 | Romanov et al. | 415/115 |
| 7,334,980 B2 | * | 2/2008 | Trinks et al. | 415/1 |
| 2005/0002779 A1 | * | 1/2005 | Tanaka | 415/173.1 |

FOREIGN PATENT DOCUMENTS

EP       1013887    *  6/2000

* cited by examiner

*Primary Examiner*—David P Bryant
*Assistant Examiner*—Alexander P Taousakis
(74) *Attorney, Agent, or Firm*—Marjama Muldoon Blasiak & Sullivan LLP

(57) ABSTRACT

An outer seal assembly of a turbine rotor stage is secured within a circumferential groove of the turbine casing in such a manner as to both fix the outer seal assembly in its installed position and also provide for sealing around its outer periphery so as to thereby prevent the leakage of cooling air therearound. A plurality of arcuate elements having an angle-shaped cross sectional profile are provided to interface between radially extending arms of the outer seal assembly and the inner surface of the casing, with a locking mechanism then being applied to secure the two structures in their installed positions. Each of the arcuate elements includes a radially extending panel, a plurality of forwardly extending hooks that are disposed within a groove in the casing, and a second forwardly extending flange that engages the rear surface of the outer seal assembly arm. As the outer seal assembly arm is urged rearwardly during operation, the arcuate element is caused to rotate about a fulcrum in the circumferential groove such that a radially outer edge of the radially extending panel is urged against a casing inner surface so as to thereby enhance the sealing relationship therebetween.

6 Claims, 3 Drawing Sheets

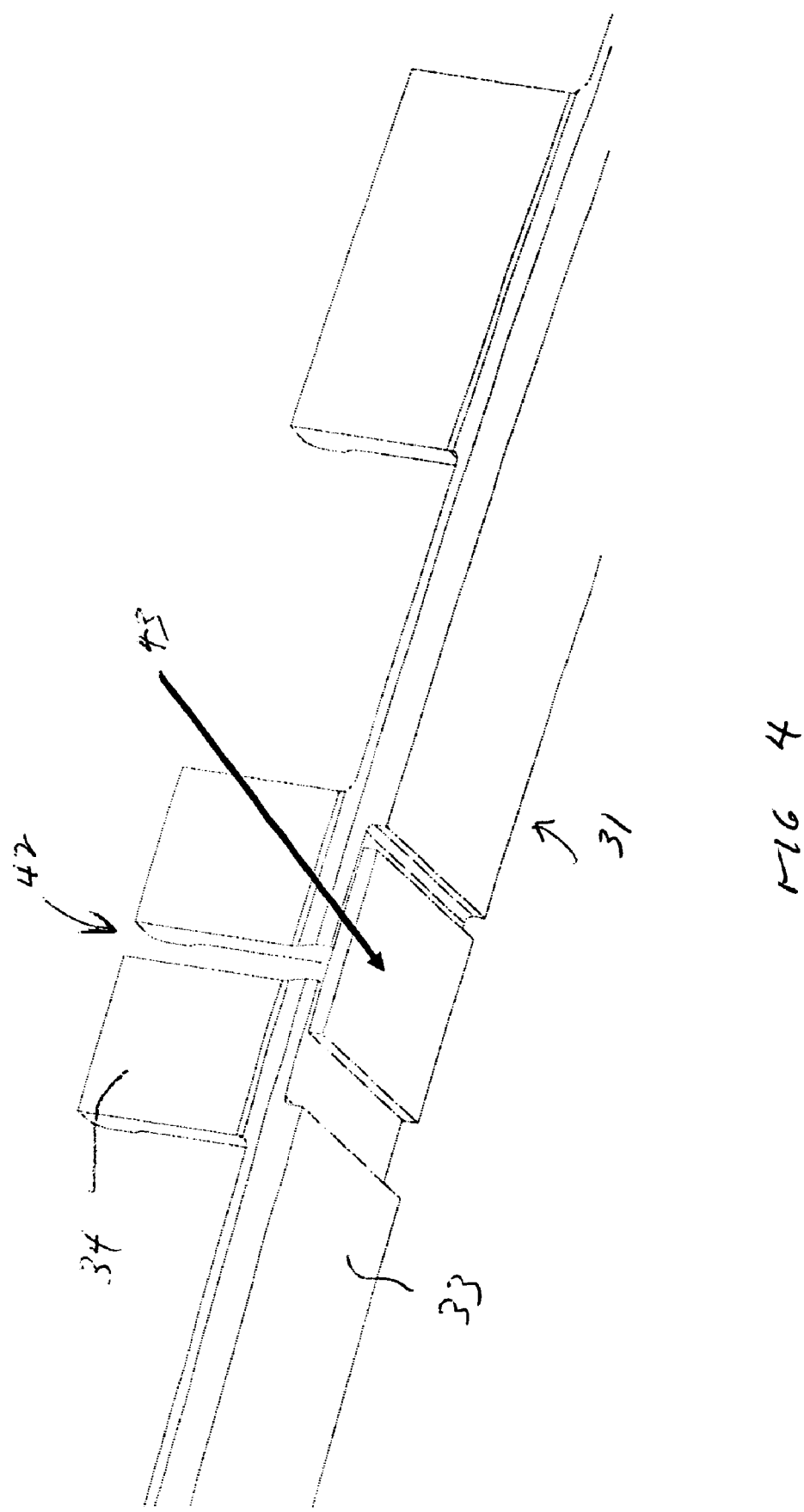

ns and alternate constructions can be made thereto without departing from the true spirit and scope of the invention.

BLADE OUTER SEAL ASSEMBLY

STATEMENT OF GOVERNMENT INTEREST

The United States Government has certain rights in this invention pursuant to contract number N00019-02-C-3003 between the United States Navy and United Technologies Corporation.

CROSS REFERENCE TO RELATED APPLICATIONS

This application is related to U.S. patent application Ser. No. 11/091,204 filed Mar. 28, 2005, now U.S. Pat. No. 7,334,980, filed concurrently herewith and incorporated herein by reference.

FIELD OF THE INVENTION

The invention relates generally to jet engines and, more particularly to a blade outer air seal assembly for use in the turbine section of a jet engine.

BACKGROUND OF THE INVENTION

In a jet engine, wherein a turbine rotor is mounted for rotation within an engine casing, it is common to provide a blade outer air seal (BOAS) between the casing and the turbine rotor so as to prevent or reduce leakage therebetween. Typically, the BOAS is mounted in the casing by way a bolted flange on the inner periphery of the casing. The purpose of the bolted flange is to accurately and reliably locate the BOAS and to provide effective sealing against the leakage of BOAS cooling air which is circulated on the radially outer side of the BOAS to cool and purge the BOAS.

Such a bolted flange assembly is relatively heavy, and ongoing efforts to reduce the weight of a jet engine favor the elimination of such a bolted flange. If the bolted flange is eliminated, however, an alternative approach to securing the BOAS in place, and for sealing against the leakage of cooling air, must be provided.

SUMMARY OF THE INVENTION

In accordance with one aspect of the invention, provision is made for locating and securing the BOAS of a jet engine turbine rotor without the use of a bolted flange in the engine casing.

By another aspect of the invention, the inner periphery of the engine casing is so shaped and includes both radially and axially extending flanges which matingly receive a specially designed locking and retention assembly, which fixes the BOAS in its installed position and also provides for sealing of its rear periphery.

By yet another aspect of the invention, the sealing and retention assembly includes a plurality of annular segments that are angle-shaped in cross section with one arm of the angle-shaped segment axially engaging a portion of the BOAS and the other arm being so disposed and engaged with the flanges of the casing as to allow the angle-shaped segment to be rotated about a fulcrum, and by such movement causing a surface of the angle-shaped segment to conformingly engage a mating surface on the casing so as to thereby provide a sealing function while positioning the BOAS.

In the drawings as hereinafter described, a preferred embodiment is depicted; however, various other modifica-

DETAILED DESCRIPTION OF THE INVENTION

Figure 1:
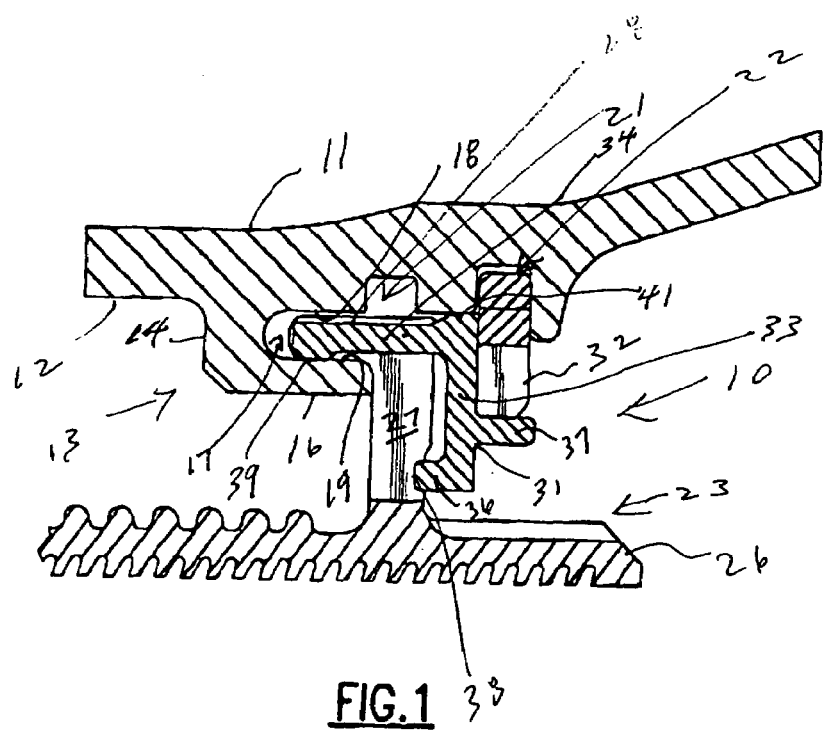
FIG. 1 is a partial side elevation sectional view illustrating the blade outer seal assembly in accordance with the present invention.

Referring now to FIG. 1, an annular outer air seal assembly is shown generally at 10 as applied to an inner surface of a turbine casing 11. As an integral part of the inner surface 12 there is a circumferentially disposed mounting flange 13 having a radially inwardly extending leg 14 and an axially extending leg 16. The mounting flange 13 forms a circumferential groove 17 between an inner surface 18 of the turbine casing 11 and an outer surface 19 of the axially extending leg 16. Also formed on the inner side of the turbine casing 11 are the circumferential slots 21 and 22.

Figure 2:
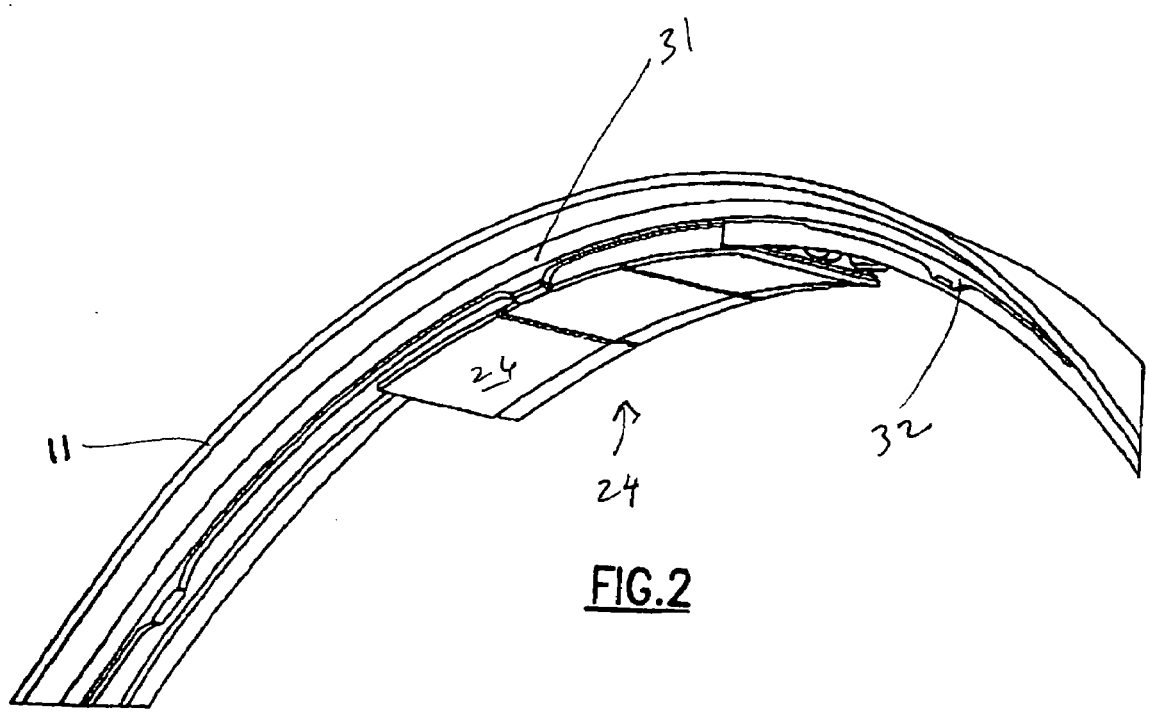
FIG. 2 is a perspective view of a radial segment thereof as shown from the inner side.

The above described structure within the turbine casing is adapted to support a blade outer air seal (BOAS) shown at 23 in FIG. 1. As will be seen in FIGS. 1-3, the BOAS comprises a plurality of circumferentially spaced, interconnected segments 24 having a generally axially extending seal portion 26, a plurality of radially disposed arms 27 (See FIG. 1) and a plurality of hanger elements 28. The arms 27 are hidden in FIG. 3 but are shown in FIG. 1, whereas the hanger elements 28 are hidden in FIG. 1, but shown in FIG. 3. The hanger elements 28 fit into the circumferential groove 17 and are supported by the axially extending leg 16.

Figure 3:
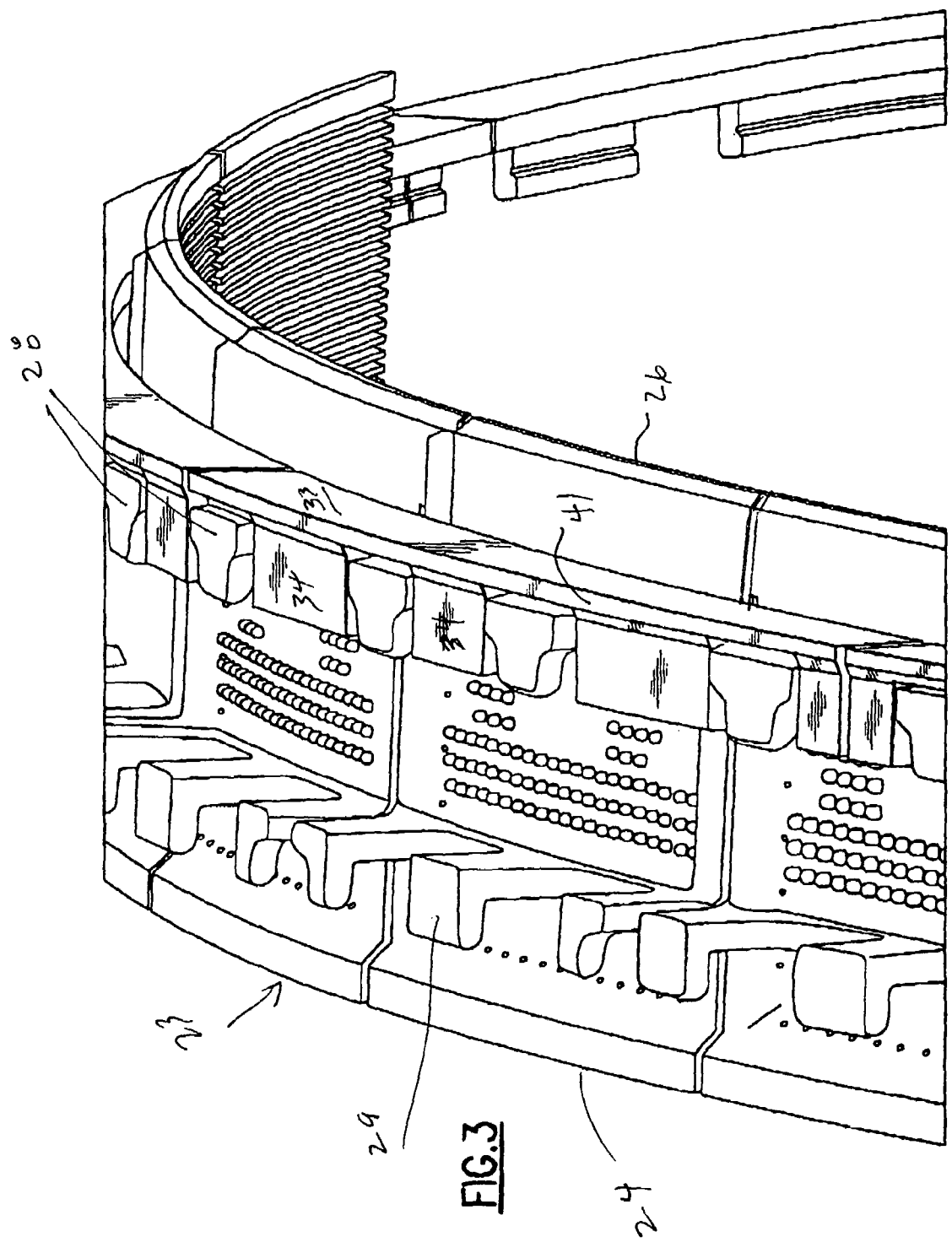
FIG. 3 is a perspective view of a radial segment thereof as shown from the outer side.

As shown in FIG. 3, in addition to the arms 27 and hanger elements 28, the BOAS segments 24 have other support elements 29 disposed toward their upstream end which are mounted in appropriate structure on the inner side of the turbine casing 11 but not shown in FIG. 1.

Although the axially extending leg 16, in cooperation with the hanger elements 28, acts to position and support the BOAS segments 24 in the radial direction, it is also necessary to locate and fix these seal elements in the axial direction. This is accomplished by the use of an angle-shaped seal 31 and a split retention ring 32. The angle-shaped seal 31 is dual purpose in that it provides, in conjunction with the split retention ring 32, a physical locating device for the BOAS, as well as providing sealing for the higher pressure air outboard of the BOAS which is used to cool and purge the BOAS.

Referring again to FIG. 1 and FIG. 3, the angle-shaped 31 seal comprises a radially disposed arcuate-shaped panel 33 with a plurality of axially extending hooks 34. As shown in FIG. 3, the hooks 34 fit circumferentially between the hanger elements 28 of the BOAS, with both being disposed within the groove 17 as shown in FIG. 1. For purposes of assembly, the BOAS segments 24 are first assembled from the rear of the engine, with the hanger elements 28 sliding into the circumferential groove 17, and then the multiple arc-shaped angle-shaped seal segments 31 are slid behind and hook into the same groove 17 to either side of the BOAS hanger elements 28.

Also projecting from the radially disposed arcuate-shaped panels 33 are the forwardly extending flanges 36 and the rearwardly extending flanges 37. The ends of the forwardly extending flanges 36 fit into slots 38 on the rear side of the arm elements 27 as shown in FIG. 1. It is these forwardly extending flanges 36 which bear against the slots 38 to hold the BOAS in its axial position. The retention ring 32 then interacts with the rearwardly extending flange 37 and the circumferential slot 32 to lock the assembly in its position. The details of how this occurs is fully described in U.S. patent application Ser. No. 11/091,204 filed concurrently herewith and incorporated herein by reference.

In addition to the function of the forwardly extending flange 36 acting to bias the BOAS forwardly, an advantage is taken of the tendency for the BOAS arm element 27 to be rotated as the BOAS is biased rearwardly because of the pressure differential across the BOAS, to aid in the sealing function. That is, as the BOAS is moved rearwardly against the forwardly extending flange 36, the angle-shaped seal 37 is rotated about the fulcrum that exists between the leg outer surface 19 and a pad 39 on the axially extending hook 34. With the rotation of the angle-shaped seal, a radially outer surface 41 of the arcuate-shaped panel 33 is biased against the inner surface 18 of the casing 11 to provide a sealing relationship that prevents the leakage of cooling air rearwardly. Thus, with the engagement of these two surfaces and those of the forwardly extending flanges 36 in the slot 38, a seal is created to prevent the rearward flow of the cooling air.

One of the noteworthy concepts of the above described design is the relatively long axially extending hooks 34. Due to tolerance stack up, other retention schemes considered would not provide any consistent axial stop location for the BOAS. For example, a radial segment fitting into the case but extending inwardly enough to provide the seal could have an axial position tolerance of 0.002 inches with the case slot. With the long arm, this distance could translate into a substantial amplification of the tolerance on the piece, allowing the BOAS to slide aft by a significantly greater amount. With the current design however, any aft motion of the BOAS produces a tilt on the angle-shaped seal. With a similar 0.002 inch tolerance on the axially positioning of the axially extending hooks 34, the BOAS can slide aft by no more than 0.002 inches. Accordingly, tight control of the tolerance in the radial distance between the casing inner surface 18 and the axially extending leg outer surface 19 is critical to ensure a consistent preload of the L-seal. Further, the effect of segment to segment variations in part length is also minimized with this design.

In addition to the length of the axially extending hooks 34, the radial height of the panel 33 is important. This radial height is preferably set to provide a sealing surface against the inboard portion of the BOAS and for ease of assembly.

Referring now to FIG. 4, there are a pair of adjacent angle-shaped segments 31 and, as will be seen, there is a gap 42 that exists both between the adjacent axially extending hooks 34 and between the adjacent arcuate-shaped panels 33. With respect to the gap between the adjacent arcuate-shaped panels 33, leakage of cooling air can occur therebetween, and therefore it is necessary to seal this gap. This is accomplished by way of a shiplap arrangement that is obtained by attaching small plates 43 that cover the gap 42 and extend in overlapping relationship over the adjacent arcuate-shaped panels 33. The plates 43 are preferably attached by welding or the like. Alternatively, the plates 43 could be produced by machining them from the solid segments.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. Apparatus for securing an outer seal assembly of a turbine rotor stage to a turbine casing comprising:
   a plurality of radially outwardly extending arms on said outer seal assembly, said arms having a rear surface and a plurality of axially forwardly extending hanger elements;
   a mounting flange formed on the inner side of said casing and having a radially inwardly extending leg and an axially rearwardly extending leg with a radially outer surface which, together with the inner side of said casing, forms a circumferential groove for receiving said hanger elements therein;
   a plurality of arcuate elements having an angle-shaped cross section and comprising a radially extending panel with a plurality of axially forwardly extending hooks adapted to be received in said circumferential groove and having at least one axially forwardly extending flange for engaging said arm rear surface of said outer seal assembly; and
   a lock for locking said outer seal assembly and angle-shaped flange in their installed positions within said grooves.

2. Apparatus as set forth in claim 1 and further wherein said outer seal assembly arm rear surface includes at least one slot for receiving said axially forwardly extending flange.

3. Apparatus as set forth in claim 1 wherein said arcuate elements further include an axially rearwardly extending flange for engaging with said locking means.

4. Apparatus as set forth in claim 3 and further wherein said arcuate elements include a radially outer edge which engages an inner surface of said casing in a sealing relationship.

5. Apparatus as set forth in claim 4 wherein, when said outer seal assembly arm rear surface is urged rearwardly against said forwardly extending flange of said arcuate element, the arcuate element is rotated in a counterclockwise direction with the radially outer surface of said rearwardly extending leg acting as a fulcrum, thereby resulting in the radially outer edge of said arcuate element being biased against said casing inner surface.

6. Apparatus as set forth in claim 5 wherein said axially forwardly extending hooks of said arcuate elements include a pad for engaging said axially rearwardly extending leg to thereby facilitate the rotational movement.

* * * * *